United States Patent [19]

Takahashi et al.

[11] Patent Number: 4,637,264
[45] Date of Patent: Jan. 20, 1987

[54] OPTICAL TORQUE DETECTOR

[75] Inventors: Tsuneo Takahashi, Kawagoe; Hirofumi Otsuka, Tokyo, both of Japan

[73] Assignee: Honda Giken Kogyo Kabushiki Kaisha, Tokyo, Japan

[21] Appl. No.: 736,054

[22] Filed: May 20, 1985

[30] Foreign Application Priority Data

May 18, 1984 [JP] Japan ............................. 59-98631
Nov. 19, 1984 [JP] Japan ......................... 59-174252[U]

[51] Int. Cl.$^4$ ............................. G01L 3/12; G01D 5/38
[52] U.S. Cl. .............................. 73/862.33; 250/231 R; 250/237 G
[58] Field of Search .................... 73/862.33, 862.34; 250/231 R

[56] References Cited

U.S. PATENT DOCUMENTS 3,688,570  9/1972  Burke, Jr. .
3,938,890  2/1976  Flavell ................. 73/862.33 X
4,430,566  2/1984  Searle ................... 250/231 SE

FOREIGN PATENT DOCUMENTS 2118722  11/1972  Fed. Rep. of Germany ... 73/862.36

Primary Examiner—Charles A. Ruehl
Attorney, Agent, or Firm—Armstrong, Nikaido, Marmelstein & Kubovcik

[57] ABSTRACT

An optical torque detecting apparatus for a rotating shaft of which torsional torque is to be detected comprising a pair of rotary plates disposed to face each other connected to the shaft with a predetermined interval between the positions where each is connected to the shaft, each plate having a radial optical grid thereon so that a Moire fringe pattern may be created in accordance with a change of relative turning between the plates caused by torsion of the shaft and a device detecting a shift of the Moire fringe pattern between radially inner and outer sections of the optical grids.

3 Claims, 12 Drawing Figures

OPTICAL TORQUE DETECTOR

BACKGROUND OF THE INVENTION

This invention relates to an optical torque detecting apparatus for detecting torsional torque of a rotating shaft member, such as a power transmission shaft or the like provided in a power transmission system of a vehicle.

A known apparatus, as disclosed in Japanese Patent Application Publication Sho No. 57-4856, for instance, has a striped pattern comprising a group of constant pitched parallel lines affixed to an outer circumferential surface of a shaft member. A camera is provided with a negative having a similar pattern to the foregoing striped pattern positioned on a focal plane thereof. The camera is positioned so that an image of the striped pattern and the negative thereof are overlapped one with another so as to become equal in size. Stroboscopic lighting is effected once per one rotation of the shaft member by being synchronized with the rotation of the shaft member, so that a Moire fringe pattern corresponding to inclination of the striped pattern made in accordance with a torsion amount of the shaft member is created on the focal plane of the camera. Thus, the torsional torque of the shaft member may be detected from the inclined Moire pattern.

This type of apparatus, however, is inconvenient in that is becomes complicated in construction, because synchronizing the stroboscopic lighting with the rotation of the shaft member is required. Additionally, the detecting of torsional torque is made only at the time point of the stroboscopic lighting, so that the detecting time is limited.

OBJECT AND SUMMARY OF THE INVENTION

This invention has for its object to provide an apparatus which is free from the foregoing inconveniences, that is, an apparatus which does not require stroboscopic lighting and is capable of detecting a torsional torque at any desired time point.

The invention is characterized in that a pair of rotary plates, each having a radial optical grid, are disposed to face one another, and are connected to shaft member (of which the torsional torque is to be detected) to have a predetermined interval between their connected positions so that a Moire fringe pattern may be created in accordance with change of a relative turning between the two rotary plates caused by torsion of the shaft member. A detecting means for detecting a shift of the Moire fringe pattern is provided so that a torsional torque of the shaft member may be detected.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Embodying examples of this invention will now be explained with reference to the accompanying drawings:

Referring to FIGS. 1-6 showing a first embodiment of the invention, a shaft member 1 is provided such as a power transmission shaft or the like provided in a driving system of a vehicle. The shaft member 1 is inserted rotatably through a casing 2. A pair of first and second rotary plates or discs $3_1$, $3_2$ are disposed in a space formed in the casing 2 and surrounding the shaft member 1 and face one another in the axial direction thereof. The two rotary plates $3_1$, $3_2$ are connected through respective connecting members $4_1$, $4_2$ fixed thereto to the shaft member 1 to leave a predetermined interval between the positions where each of them is connected to the shaft.

Figure 2:
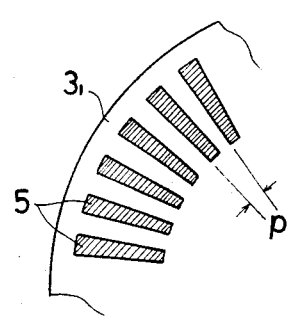
FIGS. 2 and 3 are diagrams showing shapes of grids of respective rotary plates thereof.
Figure 3:
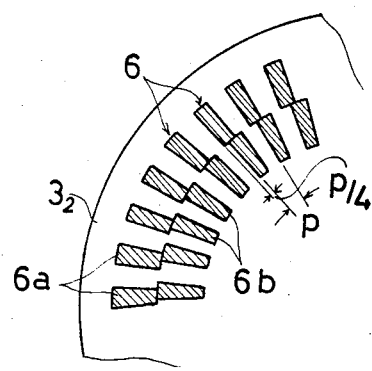

The two rotary plates $3_1$, $3_2$ are made of transparent or light permeable materials, for instance. Each plate has an optical grid 5, 6 in black color formed thereon, by printing or the like. The optical grids 5, 6 are of radially extended stripes or lines finely pitched in the circumferential direction. In this embodiment, the optical grid 5 formed on one of the two rotary plates $3_1$, $3_2$, for instance, on the first rotary plate $3_1$ is of the form wherein each line thereof is a radially extended stepless straight one, as shown in FIG. 2. The other optical grid 6 formed on the other plate, that is, on the second rotary plate $3_2$ is of the form wherein each line thereof is divided into a radially extended outer half portion 6a and a radially extended inner half portion 6b which are displaced in phase one from another in the circumferential direction by ¼ of the grid pitch P between the lines, for instance, as shown in FIG. 3.

Figure 4A:
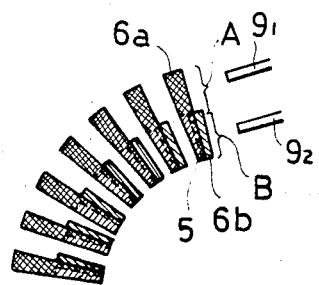
FIGS. 4a-4d are diagrams showing a transitive mode of displacements of optical grids in accordance with relative turning displacements between the two rotary plates.
Figure 4B:
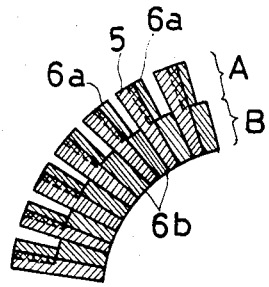
Figure 4C:
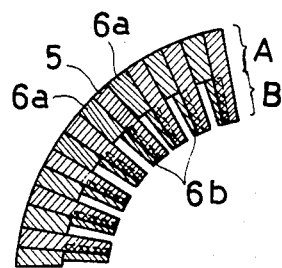
Figure 4D:
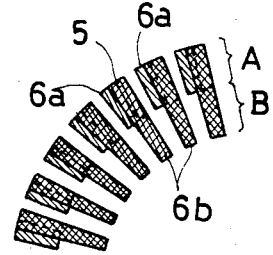

If, with this arrangement, a relative turning between the two rotary plates $3_1$, $3_2$, is generated caused by torsion of the shaft member 1, the optical grid 5 of the first rotary plate $3_1$ changes from the condition where each line thereof coincides with the outer half portion 6a of each line of the optical grid 6 of the second rotary plate $3_2$, as shown in FIG. 4a, to the condition where each line thereof coincides with each transparent clearance portion between the inner half portions 6b of the adjacent lines of the optical grid 6, as shown in FIG. 4b, by an amount of a relative turning displacement therebetween corresponding to P/4. Further relative turning results in a condition where each line of grid 5 coincides with each transparent clearance portion between the outer half portions 6a, as shown in FIG. 4c, by an amount of a further relative turning displacement therebetween corresponding to P/2. Still further relative turning results in a condition where each line of grid 5 coincides with the inner half portion 6b of each line of the optical grid 6, as shown in FIG. 4d, by an amount of a still further relative turning displacement therebetween corresponding to ¾P. Even further relative turning results in a condition equal to that shown in FIG. 4a, by an amount of a further relative turning displacement therebetween that corresponds to 1P.

As a result thereof, if viewed from a stationary system that is not rotated with the shaft member 1, a ring-shaped Moire fringe pattern is created annularly at a section B corresponding to an array of the inner half portions 6b, under the condition shown in FIG. 4b, and a Moire fringe pattern is created annularly at a section A, corresponding to an array of the outer half portions 6a, under the condition shown in FIG. 4c.

Thus, in accordance with a change in the relative turning displacement amount between the two rotary plates $3_1$, $3_2$, the Moire fringe pattern is created alternately at the section B or at the section A, as if shifted between the two sections A, B.

A detecting means 7 is provided for detecting this shift movement of the Moire fringe pattern. In the illustrated example, the detecting means 7 comprises a light projecting optical fiber element 8 connected to a light projecting portion 2a provided on the casing 2 and located on one side of the two rotary plates $3_1$, $3_2$. A pair of light receiving optical fiber elements $9_1$, $9_2$ corresponding to the section A and the section B, respectively, are connected to a light receiving portion 2b which is provided on the casing 2 and is located on the other side of the two rotary plates $3_1$, $3_2$ so that light rays transmitted through the sections A and B by projecting light rays introduced from a light source 10 through the light projecting optical fiber 8 onto the two rotary plates $3_1$, $3_2$ may be individually guided through the respective light receiving optical fibers $9_1$, $9_2$ respectively to a first optical detecting means $11_1$ corresponding to the section A and a second optical detecting means $11_2$ corresponding to the section B. Respective signals outputted from those optical detecting means $11_1$, $11_2$ may be treated by a detecting circuit for detecting the shift of the Moire fringe pattern.

In this embodiment a modification may be made wherein, by the help of a mirror or the like, the light receiving optical fiber elements $9_1$, $9_2$ are provided on the same side of the casing as the light projecting optical fiber element 8.

Figure 5:
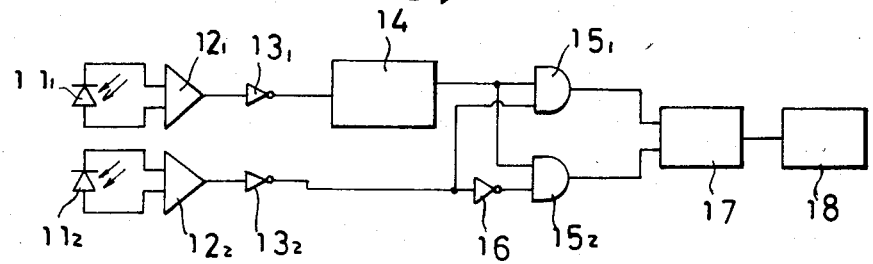
FIG. 5 is a diagram showing one example of a detecting circuit constituting a constructional element of a detecting means thereof.

The detecting circuit will be explained below with reference to a block diagram shown in FIG. 5.

Figure 6A:
FIGS. 6a, 6b are diagrams showing output signals of respective inverters on output sides of respective optical detecting means of the detecting circuit.
Figure 6B:
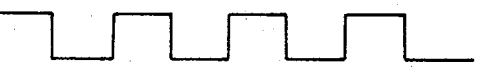

The respective optical detecting means $11_1$, $11_2$ are provided, on their output sides, with respective waveform forming means $12_1$, $12_2$ and respective inverters $13_1$, $13_2$ so that a pulse signal as shown in FIG. 6a which is synchronized with the generation of the Moire pattern at the section A may be generated from the first inverter $13_1$ connected to the first optical detecting means $11_1$, and a pulse signal as shown in FIG. 6b which is synchronized with the generation of the Moire pattern at the section B may be generated from the second inverter $13_2$ connected to the second optical detecting means $11_2$. An output signal of the first inverter $13_1$ may be inputted to a one-shot multivibrator 14 and an output signal thereof may be inputted to first and second AND gates $15_1$, $15_2$. The output signal of the second inverter $13_2$ may be inputted directed to the first AND gate $15_1$ and, through another inverter 16, to the second AND gate $15_2$. An output pulse signal of the first AND gate $15_1$ may be inputted, as an addition calculation pulse to a counter 17 connected to the two gates $15_1$, $15_2$, while an output pulse signal of the second AND gate $15_2$ may be inputted, as a subtraction calculation signal, to the counter. A torsional torque may be calculated from a counted signal outputted from the counter 17 by an output treatment circuit 18 and may be outputted therethrough.

More in detail, if the shaft member 1 is developed in its torsional amount in accordance with generation and increase in a torsional torque thereof, and the condition shown in FIG. 4a is changed to the condition shown in FIG. 4b in accordance with an increase in a relative turning displacement amount between the two rotary plates $3_1$, $3_2$, the Moire pattern is created, in the first place at the section B before it is created at the section A. An output signal of the second inverter $13_2$ is generated, whereby a high level signal is inputted to the first AND gate $15_1$ and a low level signal is inputted to the second AND gate $15_2$. If, thereafter, the foregoing condition is changed to the condition shown in FIG. 4c, the Moire pattern is created at the section A, and consequently an output signal is generated at the first inverter $13_1$, a trigger pulse is generated from the one-shot multivibrator 14, and thereby a signal addition calculation pulse is inputted from the first AND gate $15_1$ to the counter 17. Thereafter, in almost the same manner as above, each single addition calculation signal is inputted to the counter 17 at each time when there is made a relative turning displacement of the amount corresponding to one pitch of the grid.

When, on the contrary, the relative turning displacement amount between the two rotary plates $3_1$, $3_2$ is decreased in accordance with decrease in the torsional amount, there is changed from the condition shown in FIG. 4d to the condition shown in FIG. 4c. The Moire pattern is created at the section A before it is created at the section B. On this occasion, the second AND gate $15_2$ is inputted with a high level signal from the inverter 16 and a trigger pulse from the vibrator 14, so that a subtraction calculation signal is inputted to the counter 17 from the gate $15_2$. Thus, the torsional amount, accordingly, the torsional torque at the present time point of the rotating shaft member 1 can be detected from the counted signal of the counter 17.

Figure 7:
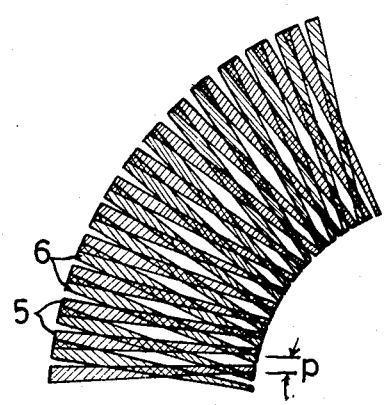
FIG. 7 is a diagram showing shapes of grids in another embodiment of this invention.

The optical grids 5, 6 formed on the two rotary plates $3_1$, $3_2$ are not limited to those of such forms used in the foregoing embodiment, but such a modification can be considered that the optical grids 5, 6 are so formed that lines of these grids may extend radially and cross one another as shown in FIG. 7, for instance. With this arrangement also, an annular Moire pattern created at any other portion that the cross point of the grids 5, 6 is shifted outwards or inwards in the radial direction or both sides of the moving cross point thereof in accordance with change in the relative turning displacement between the two rotary plates $3_1$, $3_2$. Thus, the Moire pattern is shifted across any desired single point in the radial direction once per relative turning displacement of the amount corresponding to one pitch P. The torsional torque can be detected in almost the same manner as above in a way that at least two optical detecting means are used. The shift direction of the Moire pattern and the number of the Moire patterns going across the desired point are measured.

Such an arrangement can be considered that, as disclosed in U.S. Pat. No. 3,688,570, for instance, instead of the foregoing rotary plates $3_1$, $3_2$, a pair of rotary tubes are connected to a shaft member to leave a predetermined interval therebetween. One of the tubes is inserted in the other of the tubes so that the two tubes may face one another in inner and outer relationship. Each of the two rotary tubes is formed with an optical grid comprising predetermined pitched lines in the circumferential direction thereof. Thus almost the same operation as above may be obtained.

This type of arrangement, however, is inconvenient in that it is difficult to form the optical grid on such a tubular body as above. It is also difficult and troublesome to attach each of the rotary tubes to the shaft member concentrically therewith, because it is necessary for each of the rotary tubes to be perfectly attached to the shaft member and not make any swivel movement relative thereto. Thus, in conclusion, it is more advantageous to use the rotary plates according to the present invention.

In the two foregoing examples, there is a tendency that, due to dust invading into the casing 2 or the condensation of dew in the casing 2, a diffused reflection of light between the light projecting portion 21 and the light receiving portion 2b is caused and the detecting accuracy is lowered. It can be considered, for prevention thereof, that the casing 2 is air-tightly sealed. However, it is very difficult to obtain a complete hermetical seal, and the invasion of dust can be prevented to a certain extent, but the condensation of dew cannot be prevented thereby.

Figure 1:
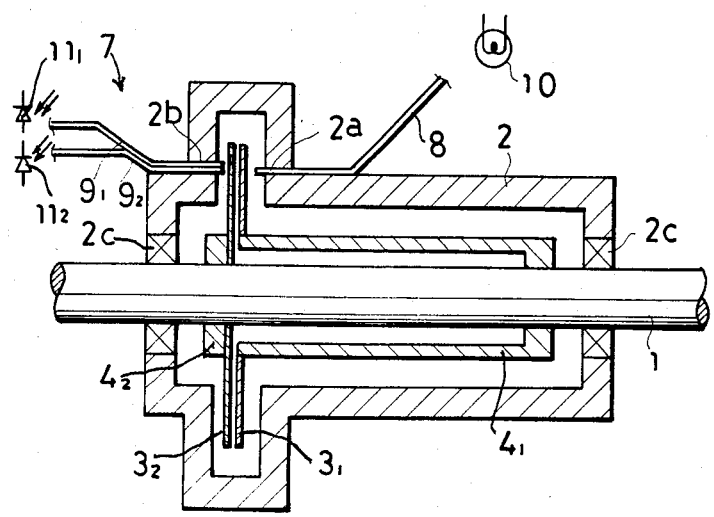
FIG. 1 is a sectional side view of one embodiment of this invention.
Figure 8:
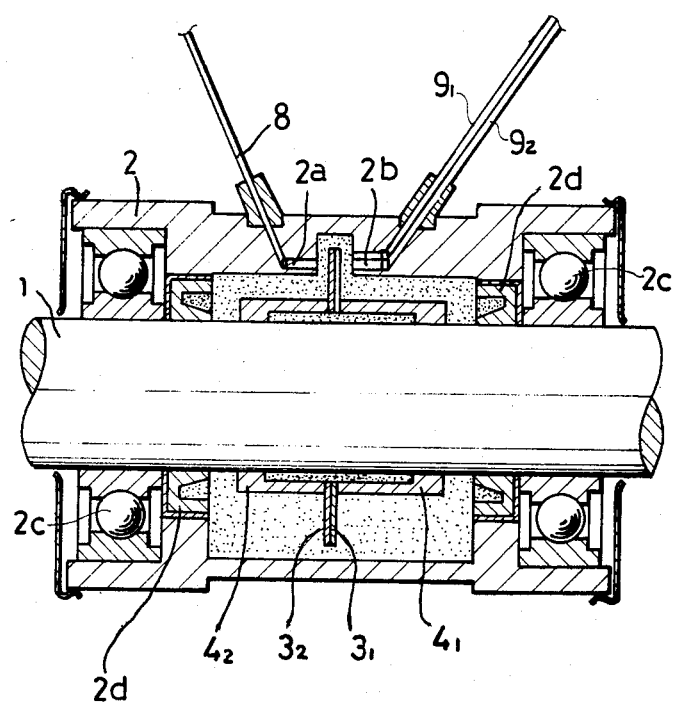
FIG. 8 is a sectional side view of a modified embodiment of this invention in which a casing thereof is filled with liquid hermetically sealed therein.

FIG. 8 shows another embodiment of this invention which can solve this problem. Namely, in this example, a seal member 2d such as an oil seal or the like is provided interposed between the shaft member 1 and an inner circumference of each end portion of the casing 2 and located inside a bearing 2c supporting the shaft member 1 so that the internal space of the casing 2 may be sealed liguid-tightly by the seal member 2d. The casing 2 is filled with liquid.

Here, insuring of a liquid-tightness of the casing is extremely easier than insuring of an air-tightness thereof. Invasion of external air into the casing 2 can be prevented by the liquid filled therein, so far as the liquid-tightness can also surely prevent moisture contained in the external air from going into the casing 2 and condensing therein. The detecting environment between the light projecting portion 2a and the light receiving portion 2b can be always kept at a constant condition, and occurrence in a detecting error caused due to a varied environmental condition can be prevented.

It is desirable to use a liquid in the casing that is stable in its optical, physical and chemical properties under a presumable environmental condition. In this respect, a silicone series oil, for instance, is suitable. The liquid may be filled into the casing 2 under pressure as an occasion demands.

The silicone series oil is transparent within a temperature range of −30 degrees C. to 70 degrees C., and also is high in viscosity and advantageous for insuring the liquid-tightness.

Thus, according to this invention, by a relative turning displacement between a pair of rotary plates caused by torsion of a shaft member, a Moire fringe pattern is created owing to displacement between optical grids formed on the respective rotary plates, so that a torsional torque amount can be detected by detecting a shift of the Moire pattern, without using stroboscopic lighting. Because the stroboscopic lighting can be eliminated, the apparatus can decreased in price by that amount. Additionally, torsional torque can be always detected without being restricted on its detecting time. Further, the optical grids are formed on the rotary plates, so that manufacturing thereof and attaching thereof to the shaft member can be facilitated as compared with these in such a case that rotary tubes are used as mentioned before. This invention is advantageous in a case where the same is actually applied to a vehicle or the like for controlling an engine, a transmission or the like in accordance with a torsional torque.

It is readily apparent that the above-described optical torque detector meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An optical torque detecting apparatus for a rotating shaft of which torsional torque is to be detected, comprising a pair of rotary plates disposed as to face one another connected to the shaft with a predetermined interval between the positions where each is connected to the shaft, each plate having a radial optical grid thereon, so that a Moire fringe pattern may be created in accordance with change of relative turning between the two rotary plates caused by torsion of the shaft, and detecting means for detecting a shift of the Moire fringe pattern between radially outer and inner sections of the optical grids so that the torsional torque of the shaft may be detected thereby; each line of the optical grid formed on one of the two rotary plates being a radially extended straight stepless line, and each line of the optical grid formed on the other of the two rotary plates being a stepped one comprising a radial directional inner half portion and a radial directional outer half portion which are different in phase one from another by ¼ of the pitch of the optical grid, the detecting means comprising a pair of optical detecting means for detecting respective light rays transmitted through the radial directional outer portion and the radial directional inner portion of the two rotary plates so that the number of times of the shift of the Moire pattern between the foregoing two sections and the direction of the shift thereof may be reliably detected by output signals from the two optical detecting means.

2. An optical torque detecting apparatus as claimed in claim 1, further comprising a casing for supporting the shaft member passed therethrough, said casing having an internal space which is sealed liquid-tightly and filled with liquid, the two rotary plates being housed in the casing, and wherein the casing is provided with a light projecting portion and a light receiving portion for the two rotary plates.

3. An optical torque detecting apparatus as claimed in claim 2, wherein the liquid is a silicone series oil.

* * * * *